United States Patent

Wells

Patent Number: 5,034,931
Date of Patent: Jul. 23, 1991

[54] DISPLAY DETECTION ENHANCEMENT

[75] Inventor: Donald R. Wells, Villa Park, Calif.

[73] Assignee: Hughes Aircraft Company, Los Angeles, Calif.

[21] Appl. No.: 537,410

[22] Filed: Jun. 13, 1990

[51] Int. Cl.$^5$ ............................................. G01S 3/80
[52] U.S. Cl. ................................... 367/126; 367/136
[58] Field of Search ............... 367/136, 126, 124, 118; 342/193

[56] References Cited

U.S. PATENT DOCUMENTS 3,764,213 10/1973 O'Meara ................................. 356/5
4,256,275 3/1981 Flick et al. ........................... 342/193

Primary Examiner—Daniel T. Pihulic
Attorney, Agent, or Firm—Wanda K. Denson-Low

[57] ABSTRACT

A system and method for enhancing detection of target signals in a passive detection system. The present invention enhances noise limited detection by combining energy from several frequencies, the fundamental and related harmonics. The present invention processes fundamental frequency signal $f_o$ and a plurality of harmonic frequency signals $2f_o$, $3f_o$ ... $nf_o$ that are embedded in background noise. In one embodiment these signals are summed and the summed signal is compared to a threshold to generate a target detection signal. In another embodiment, the plurality of harmonic frequency signals are processed to determine the background noise level and to determine which of the harmonic frequency signals may be harmonics of the fundamental frequency signal. The fundamental frequency signal and the harmonic signals that are determined to be harmonics of the fundamental frequency signal are summed to provide the summed signal. The summed signal is compared to a threshold level that is indicative of the background noise level to provide an enhanced target detection signal. In either embodiment, the enhanced target detection signal is displayed to an operator. If the precise location of $f_o$ is not known, several frequency bins centered around the expected frequency $f_o$ are processed along with their potential harmonic frequencies.

9 Claims, 1 Drawing Sheet

DISPLAY DETECTION ENHANCEMENT

BACKGROUND

The present invention relates generally to methods of enhancing display detection in passive sonar systems, and more particularly, to methods of enhancing display detection using harmonics of detected energy at several frequencies to improve the sensitivity of such passive sonar systems.

A detectable target typically radiates signals over a wide bandwidth. The energy contained in the radiated signals is thus spread over a wide spectrum of frequencies with only a fractional part of the total energy present at a given frequency. When uncorrelated noise and clutter is added to the radiated signals, it becomes more and more difficult to extract the target signals from the noisy signals.

Conventional detection circuitry operates on single frequencies or on single narrow frequency bands. The conventional detection circuitry only processes a band of frequencies from which only one signal frequency of the target signal is processed at any one time. As a result, only energy from a single frequency is used for target detection in conventional passive sonar systems, for example. This places a significant constraint on detection ability of conventional circuitry. When operating in a high noise environment, the resulting low signal to noise ratio of the target signal results in a generally unacceptable trade-off between no detection or unacceptable false alarm incidents.

Accordingly, it is the objective of the present invention to overcome the inherent bandwidth limitations of present target detection circuitry and to more fully utilize the total energy content of the radiated target signals. It is further an objective of the present invention to utilize the harmonics of a target signal to enhance the detectability thereof.

SUMMARY OF THE INVENTION

In view of the foregoing objectives, the present invention provides for a system for, and method of, enhancing detection of target signals in a passive detection system. The present invention enhances noise limited detection by combining energy from several frequencies, namely the fundamental and its related harmonics.

The system in accordance with the principles of the present invention comprises a receiving circuit that is adapted to receive signals including a fundamental frequency signal ($f_o$) and a plurality of harmonic frequency signals ($2f_o$, $3f_o$... $nf_o$) that are embedded in background noise. A processor is coupled to the receiving circuit that is adapted to process the plurality of harmonic frequency signals to determine the background noise level and to determine which of the frequencies are harmonics of the fundamental frequency signal.

Switching circuitry is coupled to the processor and the receiving circuit signals that is adapted to transfer selected ones of the harmonic signals in response to signals provided by the processor that are determined to be harmonics of the fundamental frequency signal. Integration circuitry is coupled to the switching circuitry and is adapted to receive the fundamental frequency signal and the transferred harmonics thereof, and incoherently integrate the fundamental and harmonic frequency signals to provide a summed signal.

Thresholding circuitry is coupled to the integration circuitry that is adapted to process the summed signal by comparing it to a threshold level that is indicative of the background noise level determined by the processor and to provide an enhanced target detection signal. A video display is coupled to the thresholding circuitry for displaying the enhanced target detection signal to an operator.

One method of enhancing target detection when target signals are imbedded in background noise in accordance with the present invention comprises the following steps. Signals comprising a fundamental frequency signal ($f_o$) and a plurality of harmonic frequency signals ($2f_o$, $3f_o$... $nf_o$) embedded in the background noise are received for processing. The plurality of harmonic frequencies are processed to determine the background noise level and to determine which of the harmonic frequency signals contain harmonics of the fundamental frequency signal. The fundamental frequency signal and those harmonic signals that are harmonics thereof are intergrated to provide a summed signal. The summed signal is then processed by comparing it to a threshold level that is a function of the background noise level to provide an enhanced target detection signal. The enhanced target detection signal is then displayed on a monitor, for example. Obviously, if the presence of a signal fundamental is in question due to excessive noise, then the presence of the corresponding harmonic frequency signals may also be in question. Therefore, the existence or absence of harmonic signals can only be estimated by thresholding the signal at a level that provides an overall detection enhancement. For example, harmonic bins that typically, perhaps are known to contain noise alone should be excluded from the summation step in the processing to avoid adding a signal known to be only noise. This problem is addressed later in this description.

The present invention increases the sensitivity of operator detected display signals, and increases the sensitivity of passive sonar systems, for example. The present invention improves the operator detection sensitivity by adding all the detected signal energy in the harmonics of $f_o$ ($2f_o$, $3f_o$... $nf_o$) either by incoherent integration or by time multiplexing and displays the sum on the $f_o$ frequency bin. In practice, the precise location of $f_o$ may not be known, so that it may be necessary to repeat this process for several frequency bins centered around the expected $f_o$. In this case the fundamental frequency is designated as $f_o \pm \Delta f$ and its harmonics are designated as $nf_o \pm n\Delta f$ where $\Delta f$ is a small frequency difference from the expected value of $f_o$.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
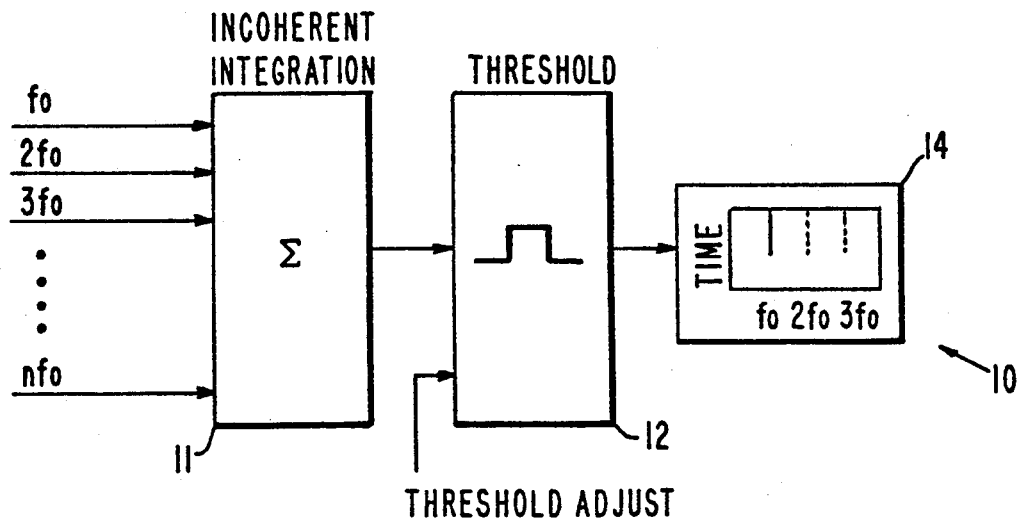
FIG. 1 is a schematic diagram of a first embodiment of a target detection system in accordance with the principles of the present invention.

Referring now to FIG. 1, there is shown a schematic diagram of a first embodiment of a target detection enhancement system 10 in accordance with the principles of the present invention. The target detection enhancement system 10 may be used to improve performance of a detection system such as a passive sonar system, for example, in which detected target signals are displayed to an operator. One such system is the SURTASS passive sonar system, presently in the inventory of the U.S. Navy.

In this first embodiment of the invention, an integrator 11 is responsive to received target signals embedded in noise. The received target signals include a fundamental frequency signal $f_o$ and a plurality of harmonic frequency signals $2f_o, 3f_o \ldots nf_o$, some of which are related to a fundamental frequency signal of interest. The integrator 11 is a summation apparatus of the type that is designed to provide incoherent integration or time multiplexing of envelope detected target signals embedded in noise. The integrator 11 is designed to integrate or combine energy from several frequencies provided they are exact harmonics of one another. A typical integrator 11 that may be adapted for use in the system 10 of the present invention may employ hardware integration or purely software integration.

The output of the integrator 11 is coupled to a threshold detector 13, which may be any conventional threshold signal detector. Typically, the threshold detector 13 uses the Neyman-Pearson threshold detection technique criteria. A typical threshold detector 13 that may be adapted for use in the system 10 of the present invention may also perform integration in hardware or software. A threshold adjustment signal is provided to the threshold detector 13, typically provided by the operator. In this manner, the threshold of each fundamental frequency of interest may be raised if necessary, to maintain a consistent false alarm rate at each selected frequency. An output of the threshold detector 13 is coupled to a video display 14 for viewing by the operator.

In operation, a fundamental frequency signal $f_o$, a second harmonic component signal $2f_o$, a third harmonic component signal $3f_o$, and an Nth harmonic component signal $nf_o$ are applied to the integrator 11. The integrator 11 sums the incoming signals located at frequency $f_o, 2f_o, 3f_o \ldots nf_o$ into a single frequency bin to provide a summed signal. The threshold detector 13 operates on the summed signal using an operator selected threshold that optimizes the ratio of probability of detection for a given false alarm rate. The resultant summed signal is displayed on the video display 14 and assigned to the frequency bin of the fundamental frequency signal $f_o$. The effect of the operation is to add the detected signal energy contained in the harmonic frequencies with that of the fundamental frequency and thereby enhance detection capability.

In practice, the precise location of $f_o$ may not be known, so that it may be necessary to repeat the above process for several frequency bins centered around the expected $f_o$. In this case the range of fundamental frequencies are designated $f_o \pm \Delta f$ and their harmonics are designated $nf_o \pm n\Delta f$, where $\Delta f$ is a small frequency difference from the expected value of $f_o$.

The signal detection arrangement described above with reference to FIG. 1 may pay a penalty in excessive false alarms when the summed harmonic frequency bins include only noise. A system that minimizes this noise addition and subsequent loss of signal detection sensitivity is described with reference to FIG. 2. This problem is solved by applying a preliminary threshold test to each harmonic frequency bin to determine the probability that a signal is present which is in fact related to the fundamental frequency signal of interest. Uncorrelated noise and clutter is less likely to produce detection using this preliminary test.

Figure 2:
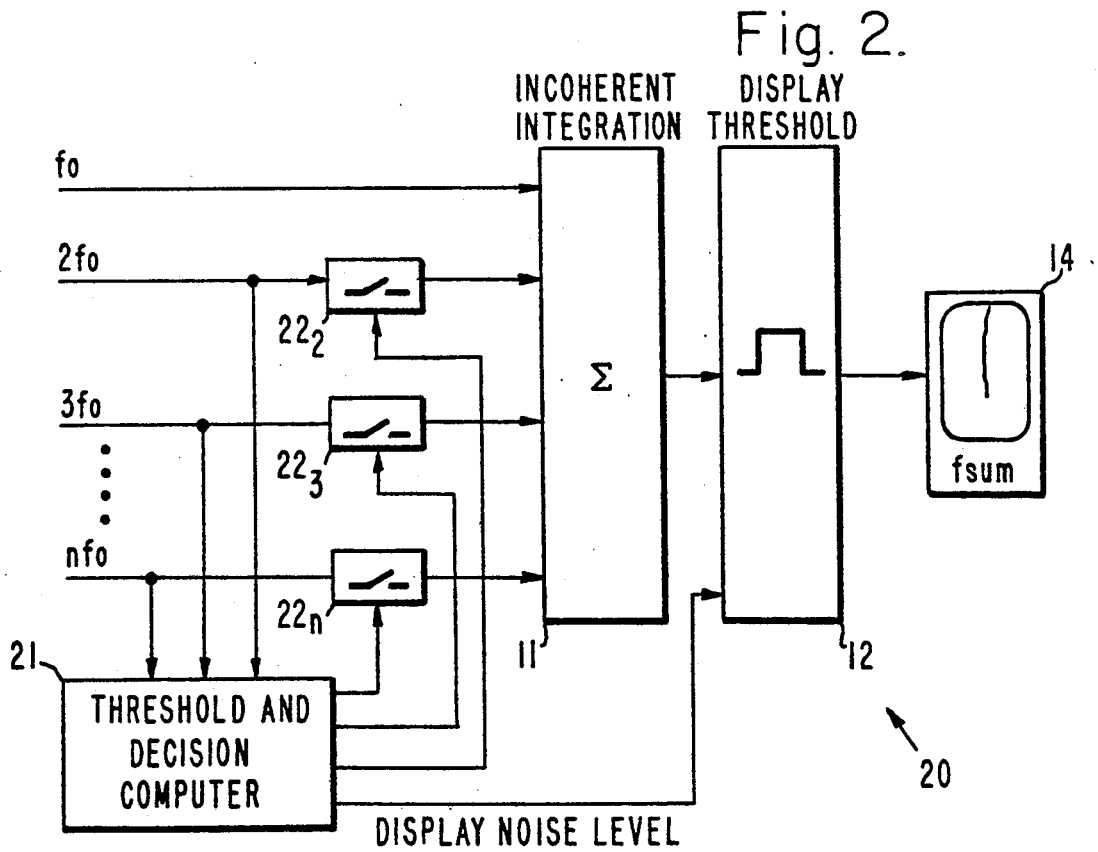
FIG. 2 is a schematic diagram of a second embodiment of a target detection system in accordance with the principles of the present invention.

Accordingly, and referring to FIG. 2, there is shown a schematic diagram of an improved target detection enhancement system 20 in accordance with the principles of the present invention. The system 20 improves on system 10 and includes the integrator 11, threshold detector 13 and video display 14 as in system 10 depicted in FIG. 1. In addition, a threshold and decision computer 21 is added to the system 10 of FIG. 1. The threshold and decision computer 21 is designed to evaluate the received harmonic signals in frequency bins $2f_o, 3f_o \ldots nf_o$ and determine whether the harmonic frequency signals in frequency bins $2f_o, 3f_o \ldots nf_o$ are related harmonics of the selected fundamental frequency signal $f_o$. This removes from the summation process any signal that is comprised of clutter or noise.

The threshold and decision computer 21 is coupled to logic input terminals of signal switches $22_2, 22_3, \ldots 22_N$ and to an input terminal of the threshold detector 13. The signal switches $22_2 \ldots 22_N$ may be standard mechanical line switches or digital computer logic gates that operate to pass or reject signal inputs depending on the logic decisions comprising outputs of the threshold and decision computer 21. Output terminals of the signal switches $22_2, 22_3, \ldots 22_N$ are coupled to the integrator 11 and are adapted to couple switched harmonic frequency signals to the integrator 11 for summation therein.

In operation, a fundamental frequency signal $f_o$ is coupled directly to the integrator 11. A second harmonic frequency signal $2f_o$, a third harmonic frequency signal $3f_o$, and up to an Nth harmonic signal $Nf_o$ are applied to corresponding signal input terminals of the signal switches $22_2, 22_3, \ldots 22_N$. At the same time the harmonic frequency signals $2f_o, 3f_o \ldots nf_o$ are also applied to the threshold and decision computer 21. The threshold and decision computer 21 evaluates the received harmonic frequency signals $2f_o, 3f_o \ldots nf_o$ to determine whether the signal contains only noise or whether the signal also contains a useful target signal. In practical operation, any one or more or these harmonic frequencies can be disengaged and removed from the integration when they are known to contribute little or no target signal, thereby removing their noise contributions in the detection process.

Three outcomes are possible from each preliminary test. First, if the intensity is below a low level preassigned threshold, a decision is made that this bin contains noise alone and it is not switched through to the integrator 11 and added the incoherent sum. Secondly, if the intensity is greater than another larger preassigned threshold, it is presumed to be part of the useful signal and is switched through to the integrator 11 and is added to the incoherent sum. Finally, if the signal in the harmonic bin is greater than the lower preassigned threshold but less that the larger one, it is assumed to be indeterminate and is assigned to a clutter file. Note that these indeterminate signals may later be included in the incoherent summing process if later samples in their respective frequency bins are determined to contain useful signals, that is, to be above the higher threshold.

The nth harmonic of $f_o$ has a bandwidth which is n times that of $f_o$. For the normal case in which all frequency bins are processed to the same width, there are n times as many frequency bins in the nth harmonic and potentially n times as much energy available for incoherent integration with the fundamental frequency signal $f_o$. Another type of threshold may also be applied to all bins of a harmonic, and this threshold may be set to either accept or reject all of the bins of a harmonic. Such a system is similar to double threshold detection which is described by a binomial distribution.

The threshold computer 21 may be adapted to perform this decision. The optimum probabilities for including a frequency bin, all bins or no bins of a harmonic is established using experience with real data. In all cases, the final threshold is determined by the need to maintain the same noise density on the video display 14 so that the operator views a uniform display noise level and is prevented from detecting noise lines. Also, the video display 14 illustrated in FIG. 2 is adapted to display a band of frequency bins around the fundamental frequency signal $f_o$ of interest to give the operator a feel for the noise density in the neigborhood of $f_o$. Typical of this type of video display 14 are the Standard Information Display (SID) employed in the Surface Towed Array System (SURTASS), currently in the inventory of the U.S. Navy.

Thus there has been described a new and improved system and method of enhancing detection of target signals in a passive detection system. The present invention enhances noise limited detection by combining energy from several frequencies, the fundamental and related harmonics. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method of enhancing target detection when target signals are imbedded in background noise, said method comprising the steps of:
   receiving signals comprising a fundamental frequency signal and a plurality of harmonic frequency signals that are embedded in background noise;
   incoherently integrating the fundamental frequency signal and harmonic frequency signals to provide a summed signal;
   processing the summed signal by comparing it to a threshold level that is a function of the background noise level to provide an enhanced target detection signal that is above the threshold level; and
   displaying the enhanced target detection signal.

2. The method of claim 1 which further comprises the steps of:
   processing the plurality of harmonic frequency signals to determine which of the harmonic frequency signals are distinguishable from the background noise; and
   incoherently integrating the fundamental frequency signal and harmonic frequency signals that are distinguishable from the background noise to provide the summed signal.

3. The method of claim 2 wherein the step of processing the plurality of harmonic frequency signals comprises the step of:
   processing the plurality of harmonic frequency signals to determine the background noise level; and
   using the determined background noise level in processing the summed signal to provide an enhanced target detection signal that is above the determined background noise.

4. A method of enhancing target detection when target signals are imbedded in background noise, said method comprising the steps of:
   receiving signals comprising a fundamental frequency signal and a plurality of harmonic frequency signals that are embedded in background noise;
   processing the plurality of harmonic frequency signals to determine the background noise level and to determine which of the harmonic frequency signals are distinguishable from the background noise;
   integrating the fundamental frequency signal and those harmonic signals that are distinguishable from the background noise to provide a summed signal;
   processing the summed signal by comparing it to a threshold level that is a function of the background noise to provide an enhanced target detection signal; and
   displaying the enhanced target detection signal.

5. The method of claim 4 wherein:
   the step of processing the plurality of harmonic frequency signals comprises the steps of:
   providing a first signal threshold level wherein signal levels below this level are defined as background noise:
   providing a second signal threshold level wherein signal levels above this level are defined as containing a useful signal; and
   determining whether each of the harmonic frequency signals are above, below or between the first and second signal threshold levels; and
   wherein the step of integrating the fundamental frequency signal and the harmonics of the fundamental frequency signal comprises the step of:
   integrating those harmonic signals that have signal levels that are between the first and second signal threshold levels and assigning these to a clutter file.

6. Target detection apparatus comprising:
   means for receiving signals comprising a fundamental frequency signal and a plurality of harmonic frequency signals that are embedded in background noise;
   means for incoherently integrating the fundamental frequency signal and the harmonic frequency signals to provide a summed signal;
   means for processing the summed signal by comparing it to a predetermined threshold level to provide an enhanced target detection signal; and
   display means coupled to the means for processing the summed signal for displaying the enhanced target detection signal.

7. The target detection apparatus of claim 6 which further comprises:
   processing means coupled to the means for receiving signals for processing the plurality of harmonic frequency signals to determine the background noise level and to determine which of the harmonic frequency signals comprise useful signal; and
   switching means coupled to the processing means and the means for receiving signals for transferring selected ones of the harmonic frequency signals in response to signals provided by the processing means that comprise useful signal distinguishable from the background noise.

8. Target detection apparatus comprising:

means for receiving signals comprising a fundamental frequency signal and a plurality of harmonic frequency signals that are embedded in background noise;

processing means coupled to the means for receiving signals for processing the plurality of harmonic frequency signals to determine which of the harmonic frequency signals comprise a useful signal;

switching means coupled to the processing means and the means for receiving signals for transferring selected ones of the harmonic frequency signals in response to signals provided by the processing means that comprise useful signal distinguishable from the background noise;

means for incoherently integrating the fundamental frequency signal and those harmonic frequency signals that are distinguishable from the background noise to provide a summed signal;

means for processing the summed signal by comparing it to a threshold level that is a function of the background noise level to provide an enhanced target detection signal; and display means for displaying the enhanced target detection signal.

9. The target detection apparatus of claim 8 wherein the processing means further comprises:

means for determining the background noise level of the received harmonic frequency signals.

* * * * *